Nov. 14, 1950   M. H. L. SÉDILLE ET AL   2,529,973
ARRANGEMENT FOR THE STARTING OF TWO SHAFT GAS TURBINE
PROPELLING MEANS CHIEFLY ON BOARD OF AIRCRAFT
Filed May 2, 1947

INVENTORS
Marcel H. F. Sédille and
Roger J. Imbert
By Watson, Cole, Grindle & Watson
ATTYS Patented Nov. 14, 1950

2,529,973

UNITED STATES PATENT OFFICE 2,529,973

ARRANGEMENT FOR THE STARTING OF TWO SHAFT GAS TURBINE PROPELLING MEANS CHIEFLY ON BOARD OF AIRCRAFT

Marcel Henri Louis Sédille and Roger Jean Imbert, Paris, France, assignors to Societe Rateau (Société Anonyme), Paris, France, a company of France, and René Anxionnaz, Paris, France Application May 2, 1947, Serial No. 745,576
In France May 29, 1946

2 Claims. (Cl. 60—35.6)

1

Propellers for aircraft comprising an air compressor controlled by a gas turbine are well known. There are propellers of this kind wherein a part of the power developed by the gas turbine is used for driving an airscrew while the gases exhausting from the turbine produce a reaction jet in a rearwardly directed expansion nozzle. There are also propellers without an airscrew and acting only by reaction. In all cases the starting of propellers of this kind, mounted on an aircraft sets a technical problem, because the extraneous auxiliary source of energy used for the starting must be the greater as the power of the propeller is greater.

The object of our present invention is to provide means whereby the extraneous power required for starting may be reduced, thus permitting the use of an auxiliary source of energy having a reduced weight which is of great importance on an aircraft.

Our invention contemplates, to this effect, the combination and adaptation of means which are known in their principles but were never combined and the combination of which produces a turbo-propeller for aircraft which is easy to start, even on a landing field lacking special means.

The said means are:

(1) Application of the known structure of turbo-propeller comprising two air compressor units in series mechanically independent of each other and driven by two independent gas turbine units, (2) Provision of air inlet valves between the compressor units, said valves being distributed around the casing which contains the compressors and the turbines, (3) Provision of gas outlet valves between the turbine units, said valves being also distributed around the said casing.

(4) Driving by the starting motor of that group only which consists of the high pressure compressor unit and of the high pressure turbine unit, while the above cited valves are simultaneously open.

Figure 1:
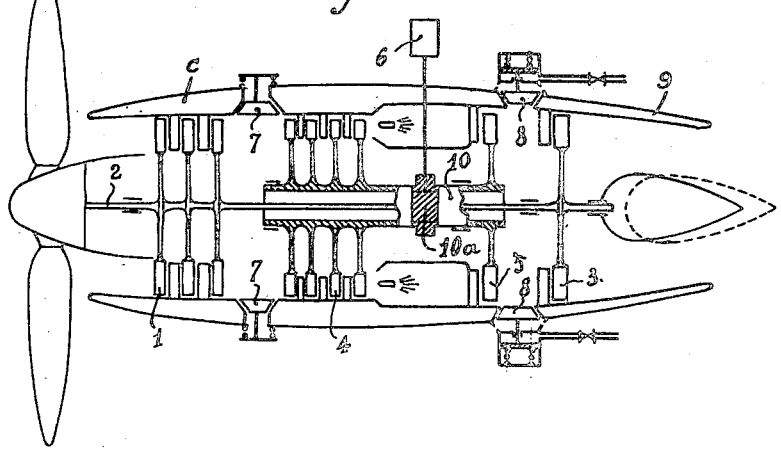

In accompanying drawing given out by way of example:

Fig. 1 is intended to illustrate the principle of our invention in the case of a turbo-propeller of the type disclosed driving an airscrew.

Figure 2:
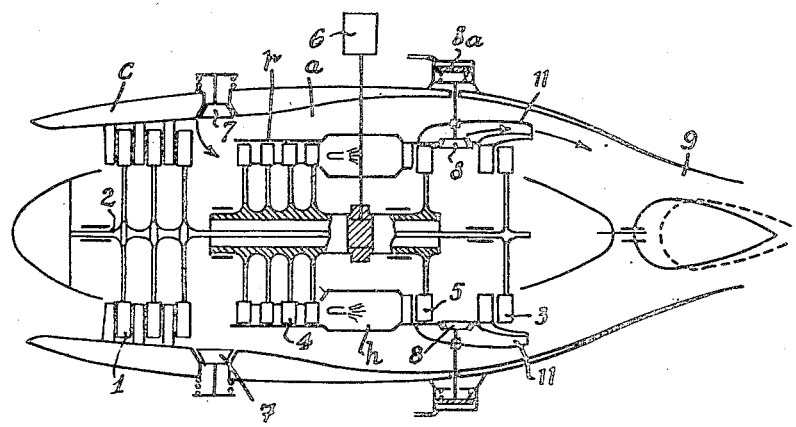

Fig. 2 relates to the case of a jet turbo-propeller operating on two fluxes of gases which are mixed together before the reaction jet nozzle.

The arrangement in Fig. 1 includes a low pressure compressor 1 driven simultaneously with the airscrew through the low pressure turbine 3 while a high pressure compressor 4 is driven through the turbine 5 and is carried by a shaft 10 that is separate from the low pressure turbine shaft 2. The shaft 10 is hollow so that only one line of shafts is obtained. Compressors and turbines are arranged inside a tunnel-like casing c extending in the fore and aft direction of the aircraft provided with a front air inlet aperture and with a rearwardly directed expansion nozzle which produces a propelling thrust by reaction effect. The starting is performed by driving the high pressure compressor 4 through a motor 6 or the like arrangement connected with the shaft 10 through a gear work 10a or otherwise. During the starting, the flap or like valves 7 are open and air enters the compressor 4 without passing through the low pressure compressor 1 or it passes through the latter only partly which reduces the depression at the entrance into 4. Similarly the flap or the like valves 8 are open and the gases are exhausted without passing through the low pressure turbine 3 or else they pass through same only partly which reduces the counterpressure at the exhaust of the turbine 5. Once the system 4—5 has started the valves 7 and 8 are closed so as to start now the low pressure set 1—3.

The flap or the like valves 7 may be automatic or controlled through any known means. If they are automatic as shown in the drawing, obviously they close without any external action after starting when the group works under normal running conditions by reason of the excess pressure existing then with reference to the outer atmosphere and similarly they will open at the start by reason of the loss of head in the first body of the compressor.

The outlet valves 8 are generally controlled through any desired control means. By way of example Fig. 1 shows valves 8 biased to normally closed position by strong springs, and which are opened when the group is started, by the pilot or by ground staff to cause admission of pressure fluid at 8a under pistons fast with said valves.

Fig. 2 illustrates a turbo-reaction jet propeller operating on two gaseous streams wherein the low pressure compressor 1 is carried by a central shaft 2 and is driven by the low pressure turbine 3. The high pressure compressor 4 is provided with an independent shaft coaxial with shaft 2 and is driven through to high pressure turbine 5.

One stream consisting of a part of the air delivered by the low pressure compressor 1 is led directly to the reaction nozzle through the annular air passage $a$ between the casing $c$ and the annular partition $a$ which includes the high pressure set 3, 4. The other stream is produced inside said partition by the other part of the air delivered by the low pressure compressor 1, which is further compressed by the high pressure compressor 4, then heated in combustion chambers $h$ and expanded in the gas turbines 5, 3. Both streams mixed together in advance of the reaction nozzle 9 are finally expanded in said nozzle for producing by reaction the propelling thrust.

The starting of such a group is obtained by driving the high pressure compressor 4 through a motor or a like arrangement 6. The flap or the like valves 7 are open at this moment and the outer air enters the compressor 4 without passing through the low pressure compressor 1 which remains stationary to start with.

The outlet valves 8 located in the exhaust of the high pressure turbine 5 are also open and their opening is controlled, for instance, through hydraulic means $8a$ as illustrated, whereby the exhaust gases do not pass through the low pressure turbine 3. This additional exhaust is directed by auxiliary nozzles 11 in a manner such that the exhausted gases go towards the expansion nozzle 9 while producing an ejection effect in the desired direction but are prevented from returning towards the suction end of the high pressure compressor. At the same time, the nozzle 9 is wide open so as to do away with the counter-pressure at the output of the turbine.

Once the high pressure compressor has started, the valves 7 and 8 are closed and the starting or acceleration of the low pressure group is performed automatically by the gases acting in the low pressure turbine 3. It is not necessary for the valves 8 to occupy the entire periphery of the space comprised between the turbine wheel 5 and the distributor of the second turbine; they are preferably distributed uniformly around said periphery and show a total cross-sectional area corresponding to the output strictly required for ensuring the operation of the group 4—5 sucking air through valves 7.

The shape of the valves illustrated should not be considered as limitative and they may assume any shape that may be deemed of interest either for furthering the flow of gases or as concerns the stresses to be exerted for their control, said shapes being selected as required by anybody skilled in the art.

What we claim is:

1. A turbo-propeller for an aircraft adapted for easy self starting, comprising a tunnel-like casing extending in the fore and aft direction of said aircraft and provided with a front air inlet aperture and with a rearwardly directed expansion nozzle, an annular partition in said casing beginning at a point spaced from the said front aperture and ending in advance of the expansion nozzle, said partition providing between it and the casing an annular air passage extending towards the said expansion nozzle, an air compressor including a low pressure unit sucking atmospheric air through said front aperture and a high pressure unit coaxially arranged with reference to the first unit but mechanically independent thereof, said low pressure unit being arranged in the said casing between said front aperture and the adjacent end of said partition so that a part of the air at low pressure delivered by said unit goes directly towards said expansion nozzle through said annular air passage, while the high pressure unit is arranged inside said partition, a combustion chamber inside said partition for generating hot gases from the air delivered by said high pressure unit, two gas turbine units arranged inside said partition, said units being fed in series with the hot gases issued from said chamber, said units being coaxially mounted and mechanically independent of each other, the high pressure gas turbine unit driving the high pressure air compressor unit and the low pressure gas turbine unit driving the low pressure air compressor unit, controllable means arranged transversely in said casing and around said casing in the interval between the delivering side of said low pressure compressor unit and the beginning of said partition for providing an auxiliary air inlet between the two compressor units, controllable means arranged transversely on said partition and around said partition for providing an auxiliary gas outlet between the two gas turbine units, and extraneous means including an auxiliary motor for starting the rotation of the group consisting of the high pressure air compressor unit and the high pressure gas turbine unit.

2. A turbo-propeller as set forth in claim 1, wherein the said controllable means providing a gas outlet between the two gas turbine units are combined with auxiliary nozzles arranged on said partition and rearwardly directed towards the said expansion nozzle.

MARCEL HENRI LOUIS SÉDILLE.
ROGER JEAN IMBERT.

REFERENCES CITED

The following references are of record in the file of this patent:

UNITED STATES PATENTS

| Number | Name | Date |
|---|---|---|
| 2,280,765 | Anxionnaz et al. | Apr. 21, 1942 |
| 2,356,557 | Anxionnaz et al. | Aug. 22, 1944 |
| 2,396,911 | Anxionnaz et al. | Mar. 19, 1946 |